(12) United States Patent
Grimm

(10) Patent No.: US 6,613,166 B2
(45) Date of Patent: Sep. 2, 2003

(54) METHOD FOR PRODUCING BRAKE DISKS FOR MOTOR VEHICLES

(75) Inventor: Walter Grimm, Solms (DE)

(73) Assignee: Edelstahl Werke Buderus AG, Wetzlar (DE)

( * ) Notice: Subject to any disclaimer, the term of this patent is extended or adjusted under 35 U.S.C. 154(b) by 0 days.

(21) Appl. No.: 09/794,168

(22) Filed: Feb. 28, 2001

(65) Prior Publication Data

US 2001/0023725 A1 Sep. 27, 2001

(30) Foreign Application Priority Data

Mar. 24, 2000 (DE) ........................................ 100 14 856

(51) Int. Cl.⁷ ................................................ C21D 8/00
(52) U.S. Cl. .................... 148/651; 148/608; 148/610
(58) Field of Search .............................. 420/67, 71, 119, 420/120, 123; 148/608, 609, 610, 621, 622, 651, 663

(56) References Cited

U.S. PATENT DOCUMENTS

| | | | |
|---|---|---|---|
| 4,126,492 A | * 11/1978 | Okunishi et al. ............ | 148/534 |
| 4,180,420 A | * 12/1979 | Sastri et al. ................. | 148/325 |
| 4,494,988 A | * 1/1985 | Schumacher et al. ......... | 420/73 |
| 4,564,392 A | 1/1986 | Ohhashi et al. | |
| 4,902,473 A | * 2/1990 | Arata et al. .................. | 148/325 |
| 5,906,791 A | 5/1999 | Angeliu | |
| 5,975,256 A | * 11/1999 | Kondoh et al. ......... | 188/251 M |
| 6,299,704 B1 | 10/2001 | Igarashi et al. | |
| 6,464,803 B1 | 10/2002 | Tendo et al. | |

FOREIGN PATENT DOCUMENTS

| | | | |
|---|---|---|---|
| JP | 56131847 A | * 10/1981 | ........... F16D/69/02 |
| JP | 60052562 A | 3/1985 | |
| JP | 60052562 | 3/1985 | |
| JP | 60230961 A | 11/1985 | |
| JP | 07233826 A | 9/1995 | |
| JP | 08060309 A | 3/1996 | |

OTHER PUBLICATIONS

Abstract of JP 08060309 A by Sakata et al. Aug. 24, 1994.*
ASM Handbook vol. 1: Properteis and Slelction: Irons, Steels, and High Performance Alloys. 1990. 10th edition. pp. 673–688.*
A. Fussgänger, Stuttgart, Eisengusswerkstoffe im Fahrzeugbau gestern, heute—morgen?, Konstruktion 44 (1992), pp. 193–204. No month.
Werkstoffblatt, Warmfester Stahl für Rohre und Schmiedestücke, 432 RS, Aug. 1973.

* cited by examiner

*Primary Examiner*—Deborah Yee
(74) *Attorney, Agent, or Firm*—Larson & Taylor PLC

(57) ABSTRACT

The proposed brake disk consists of steel of a composition of 0.1 to 0.4% of carbon, up to 1.0% of silicon, up to 2.0% of manganese, up to 0.02% of sulfur, 11 to 16% of chromium, up to 1.0% of nickel and 0.5 to 1.5% of molybdenum, the remainder being iron and production-related impurities.

3 Claims, 5 Drawing Sheets

V = 50 : 1

V = 50 : 1

METHOD FOR PRODUCING BRAKE DISKS FOR MOTOR VEHICLES

The invention relates to brake disks for motor vehicles, in particular passenger cars and motorcycles, and to a steel alloy, as well as to a method for producing them.

Brake disks for passenger cars consist of a one- or two-part brake ring (solid or air-cooled brake disk), which is connected with a cup-shaped hub (FIG. 1). The brake disk is fastened on the axle by means of the cup, and at the same time is rigidly fastened to the wheel by means of a screw connection. Frictional contact takes place between the brake ring and the brake linings on both sides when actuating the brake by means of hydraulic pressure. The frictional heat generated in the course of this, independently of the brake pressure and the circumferential speed, is removed by way of the brake ring and the hub. Depending on the driving conditions, temperatures of up to 600 to 800° C. can be reached on the surface of the brake disks of passenger cars. Under wet conditions a subsequent rapid cooling of the brake disk can take place. Stresses due to temperature changes are generated in the brake disk, in particular in the brake ring, through repeated sequential braking which, together with mechanical abrasion and corrosion, lead to damage of the material and limit the service life.

At present, brake disks for passenger cars are usually made of cast iron containing laminar graphite with approximately 2.5 to 4.0% of carbon, 1.8 to 2.5% of silicon, 0.3 to 1.0% of manganese, as well as trace amounts of other alloy elements. Advantages of the cast iron brake disks are the relatively low production costs and a heat conductivity which, in comparison with steel, is approximately twice as high and adds to high thermal load-carrying capacity along with good braking behavior. However, disadvantages of cast iron brake disks are their insufficient corrosion resistance, high susceptibility to wear, relatively high weight, as well as visible deficiencies because of corrosion.

The object of the invention is therefore based on making available a more corrosion-resistant brake disk for motor vehicles, and in the course of this to assure at least an equivalent braking behavior in comparison with cast iron disks for passenger cars, to achieve increased service life through greater wear resistance, to provide weight savings, and to achieve an improvement in visual appearance, which is desired in spoke-like wheels. In connection with brake disks for passenger cars, it is furthermore necessary to assure that no critical fracture formation, no deformations of the brake disk and no reduction of the braking effects occur in case of extreme braking with high thermal stresses.

In comparison with high-grade steel brake disks, which are usually employed today for motorcycles, but which are clearly less stressed in comparison with passenger car brakes, it was the object of the invention to find a material with higher corrosion resistance to aqueous hydrochloric acid, increased wear resistance and improved resistance to temperature changes (resistance to fractures under temperature change stresses).

BRIEF DESCRIPTION OF THE DRAWINGS

FIG. 2 shows the microstructure of the steel of the invention.

FIG. 3 comprises FIG. 3a) and FIG. 3b) showing a comparison of steel 1.2316 with non-balanced C/Cr proportions.

The object is attained in accordance with the invention by the use of steel of the following composition, which has been shaped by rolling or forging and has been heat-treated:

0.1 to 0.4% of carbon
up to 1.0% of silicon
up to 2.0% of manganese
up to 0.02% of sulfur
11 to 16% of chromium
up to 1.0% of nickel
0.5 to 1.5% of molybdenum,
wherein the remainder consists of iron and production-related impurities.

Following casting, the steel is compacted by rolling or forging and is heat-treated. Further processing preferably takes place by rolling of the hot strips and cold strips and soft annealing of the strip steel.

The production of the brake disks is subsequently performed by a stamping or precision cutting process. The connection between the brake ring and the cup can be provided by deep drawing, welding, casting, joining, screwing or riveting. With two-part brake disks (interior ventilated), the assembly of two individually produced disks is performed with the use of known suitable connecting techniques. In this connection it is also possible to produce the cup from a weight-saving material for reducing its weight.

In contrast to corrosion-resistant steel for brake disks of motorcycles, the type of steel in accordance with the invention is a molybdenum alloy martensitic chromium steel (see Table 1).

The profile of properties suitable for brake disks for passenger cars here is the result of a special matching of the carbon and chromium contents, as well as the simultaneous alloying of molybdenum, and preferably also manganese and nickel within the cited limits.

The carbon content has been selected to be such that carbides for increasing the hardness, wear resistance and heat resistance are formed in sufficient amounts, but brittleness-causing primary carbides and delta ferrite precipitation are prevented.

The proportion of chromium assures that in spite of the controlled carbon content, i.e. beyond the chromium carbide phase, a chromium portion of sufficient size remains dissolved in the iron matrix for obtaining the desired corrosion resistance.

Molybdenum leads to increased resistance against corrosion by hydrochloric acid and improves hot strength and hot resistance to wear.

Nickel and manganese increase the toughness.

Silicon is used for the deoxidation of steel, wherein the proportion is preferably only up to 0.5%.

Sulfur is removed metallurgically from the steel to guarantee isotropic material properties and to assure good cold forming and precision cutting properties. The proportion is advantageously limited to only 0.005%.

Figure 1:
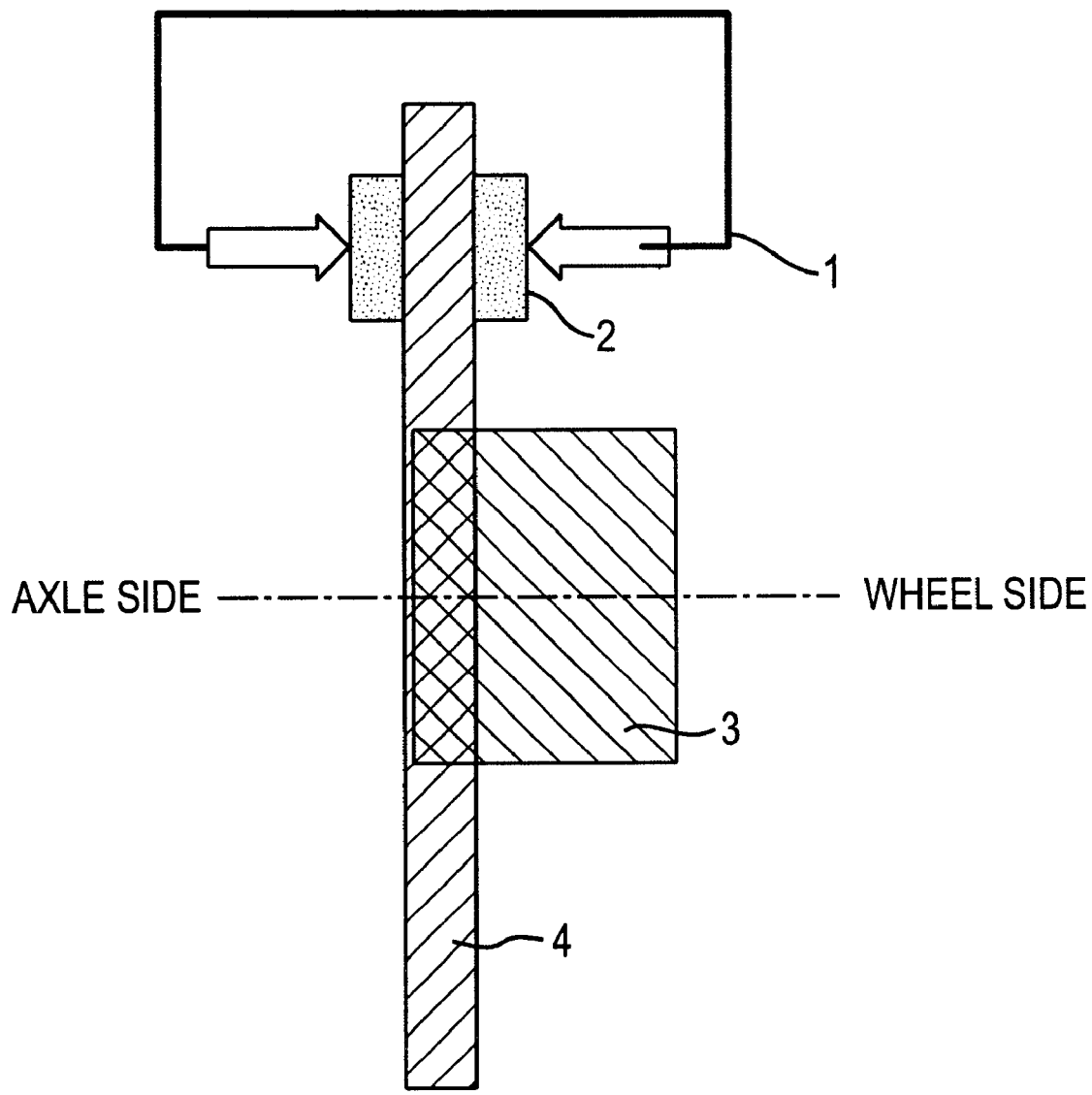
FIG. 1 is a representation of the principle of a brake disk for passenger cars.
Figure 2A:
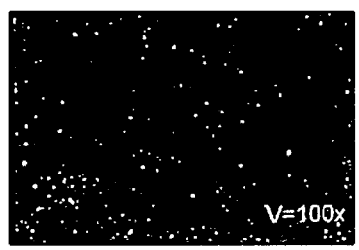
FIG. 2a) is a showing of the microstructure of the steel showing homogeneous annealing structure.
Figure 2B:
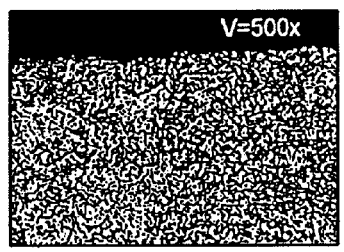
FIG. 2b) is a microstructure of the steel showing structure at the surface after a corrosion test with 10% HCL, 25 h.
Figure 3A:
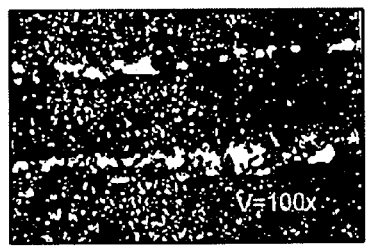
FIG. 3a) shows the structure with carbide and deltraferrite precipitations.
Figure 3B:
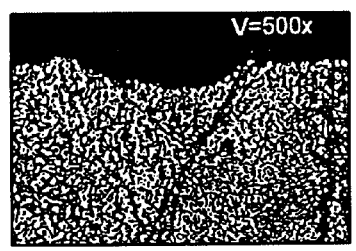
FIG. 3b) shows the structure at the surface after a corrosion test, 10% HCL 25 h.

Steel with similar analysis values is employed for corrosion-resistant plastic molds (see steel 1.2316 in Table 1). Depending on the wear conditions, strength is set there to between 900 and 1700 N/mm² by hardening and tempering. In contrast thereto, the steel in accordance with the invention is designed for a strength range between 600 and 1000 N/mm² by lowering the carbon content and the simultaneous adaptation of the chromium content. Moreover, the best possible cold-forming properties and a homogeneous structure are achieved by this. By means of the adaptation of a C/Cr proportion which is optimal for the intended use, it is possible to prevent the formation of damaging primary carbide and delta ferrite precipitation (see FIGS. 2 and 3). These precipitations would worsen the ability of processing by means of cold forming, and furthermore would decrease the corrosion resistance.

Figure 4:
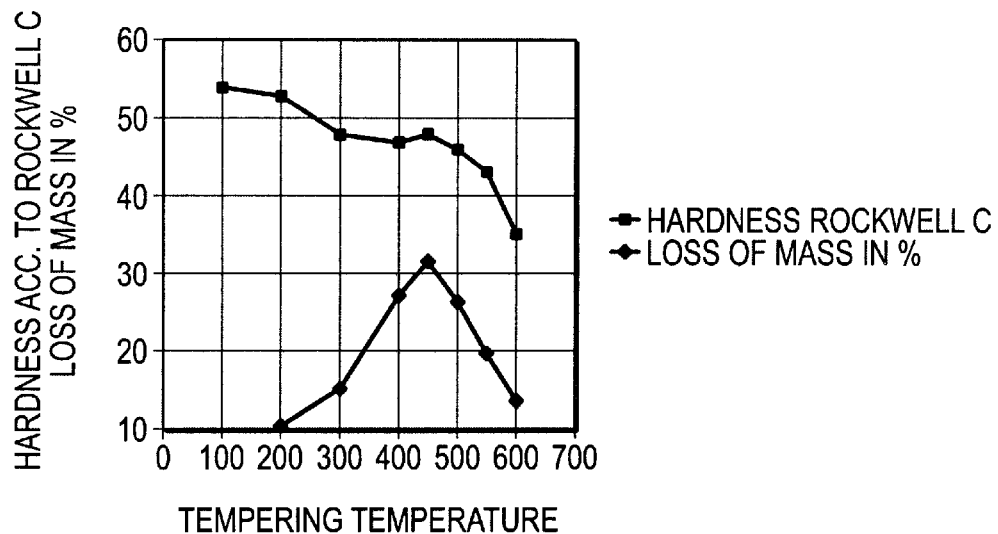
FIG. 4 shows the corrosion resistance as a function of the tempering temperature.

With the steel provided by the invention, the greatest corrosion resistance to hydrochloric acid (HCl) is achieved if tempering temperatures above 650° C. are used, from which strengths of brake disks up to 1000 N/mm² result (see FIG. 4).

Figure 5:
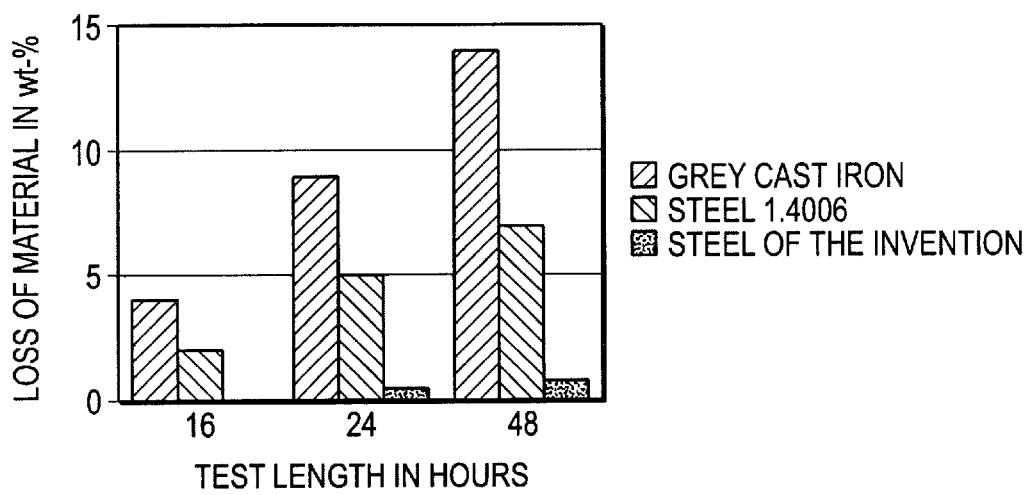
FIG. 5 is a graph showing brake disk materials in corrosion tests.

FIG. 5 shows the results of a 24 hour corrosion test in 10% hydrochloric acid at 20° C., using grey cast iron GG15, motorcycle brake disk steel X12Cr13, heat-treated to 1200 N/mm², and the steel of the invention, tempered to 900 N/mm², as the brake disk materials. It was intended here to simulate the corrosion conditions from the effect of road salt solutions under extreme winter conditions.

After 48 hours, the corrosion resistance of the steel of the invention is better by a factor of 18 in comparison to grey cast iron, and by a factor of 9 in comparison to motorcycle brake disk steel 1.4006.

Figure 6:
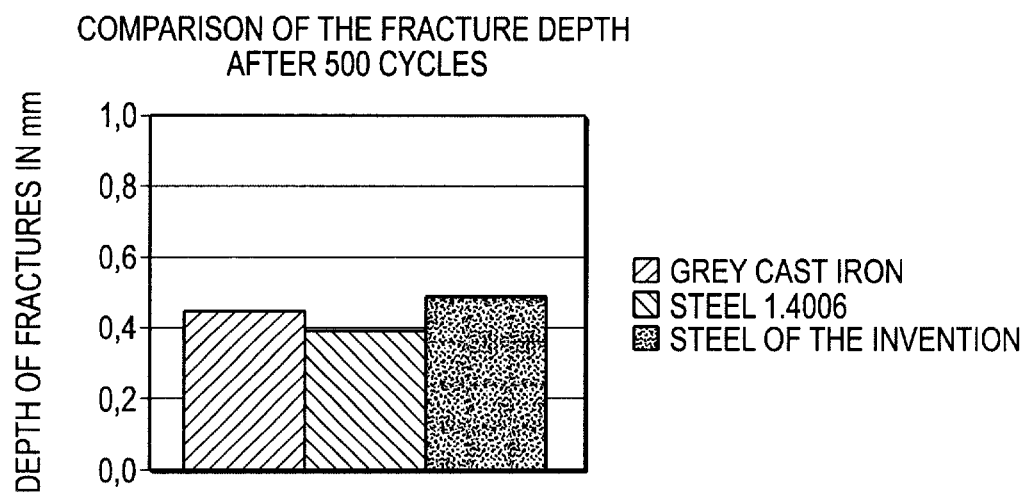
FIG. 6 is a graph showing brake disk materials in a temperature change test.
Figure 7:
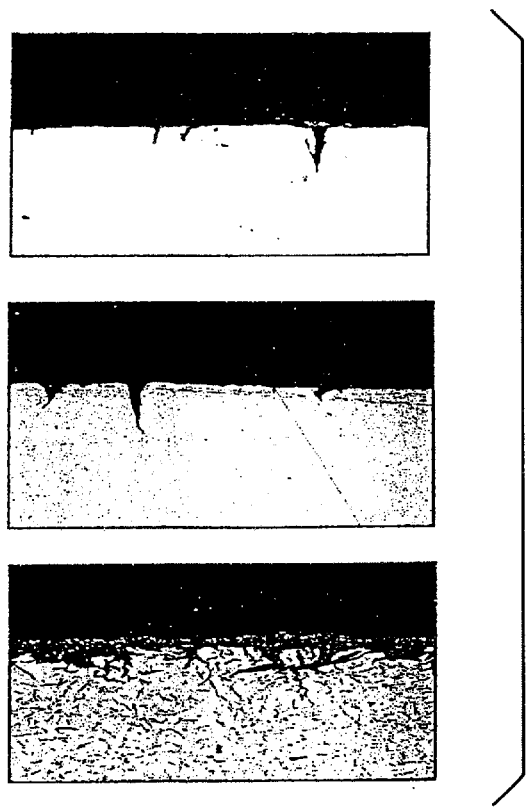
FIG. 7 comprises three views showing a comparison of the formation of fractures after 500 temperature change cycles.

The comparison of the materials in a temperature change test under the hardest conditions with the simulation of 500 cycles of panic braking, a surface temperature up to 750° C. 0 and subsequent water cooling to 100° C., is represented in FIG. 6. The maximum fracture depth in the three brake disk materials is on a comparable level. This means that the steel of the invention shows no tendency to a critical fracture formation even under extreme braking conditions, and in view of this can be considered to be the equivalent of the proven brake disk materials. The comparison of the fracture-forming structures is represented in FIG. 7.

Figure 8:
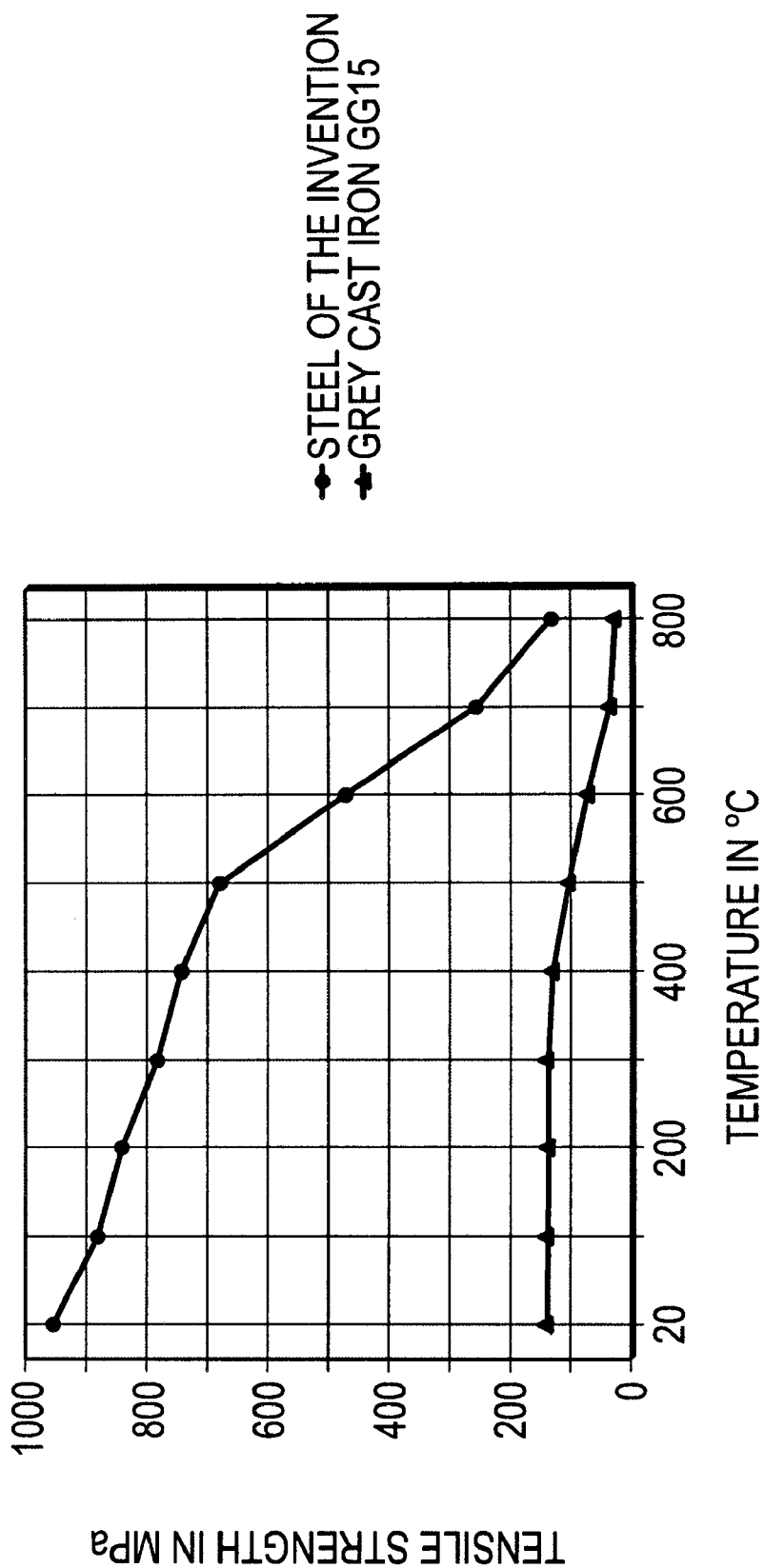
FIG. 8 is a graph showing comparison of the hot strength of the brake disk materials.

A comparison of the hot strength of the grey cast iron material GG15 and the steel in accordance with the invention is represented in FIG. 8. Greater component strength and wear resistance are provided because of the markedly higher hot strength. The higher strength values can be used as the basis for weight reductions in comparison with grey cast iron materials. On the other hand, higher component strengths can compensate disadvantages of the steel material in comparison with grey cast iron regarding heat conductivity (difference factor of 2).

In braking tests, equivalent or improved braking properties in comparison with customary cast iron brake disks could be shown when using the steel of the invention.

TABLE 1

Comparison of the chemical composition of materials for brake disks

| Material | % C | % Si | % Mn | % S | % Cr | % Ni | % Mo | Other |
|---|---|---|---|---|---|---|---|---|
| Cast Iron for brake disks | 2.5–4.0 | 1.8–2.5 | 0.3–1.0 | | <0.5 | <0.5 | <0.5 | *) |
| Motorcycle brake disk steel | ≦0.20 | <1.0 | <2.5 | <0.015 | 10.0–15.0 | <1.0 | — | *) |
| Brake disk steel of the invention | 0.2–0.3 | <1.0 | <1.5 | <0.005 | 12.0–15.0 | <1.0 | 0.6–1.2 | *) |
| Plastic mold steel material No. 1.2316 | 0.33–.043 | ≦1.0 | ≦1.0 | ≦0.030 | 15.0–17.0 | ≦1.0 | 1.0–1.3 | *) |

*)Iron and production-related trace elements and impurities

What is claimed is:

1. A method for producing a brake disk for passenger cars, characterized in that the brake disk is formed by stamping, precision cutting or cold forming from a hot-and-cold-rolled steel strip of a steel consisting of:

0.2 to 0.3% of carbon up to 1.0% of silicon up to 1.5% of manganese up to 0.01% of sulfur 12 to 15% of chromium up to 1.0% of nickel 0.6 to 1.2% of molybdenum, the remainder being iron and production-related impurities, wherein the carbon and chromium content is selected so that precipitation of primary carbides and delta ferrite is prevented and the steel is subjected to a heat treatment by annealing, hardening and tempering.

2. The method of claim 1, wherein the steel by means of the heat treatment is set to strengths of 900 to 1000 N/mm².

3. The method of claim wherein said steel has 0.6 to 1.0% of manganese and 0.2 to 0.6% of silicon.

* * * * *